(No Model.)
E. J. PENNINGTON.
MOTOR VEHICLE.
No. 570,441. Patented Oct. 27, 1896.
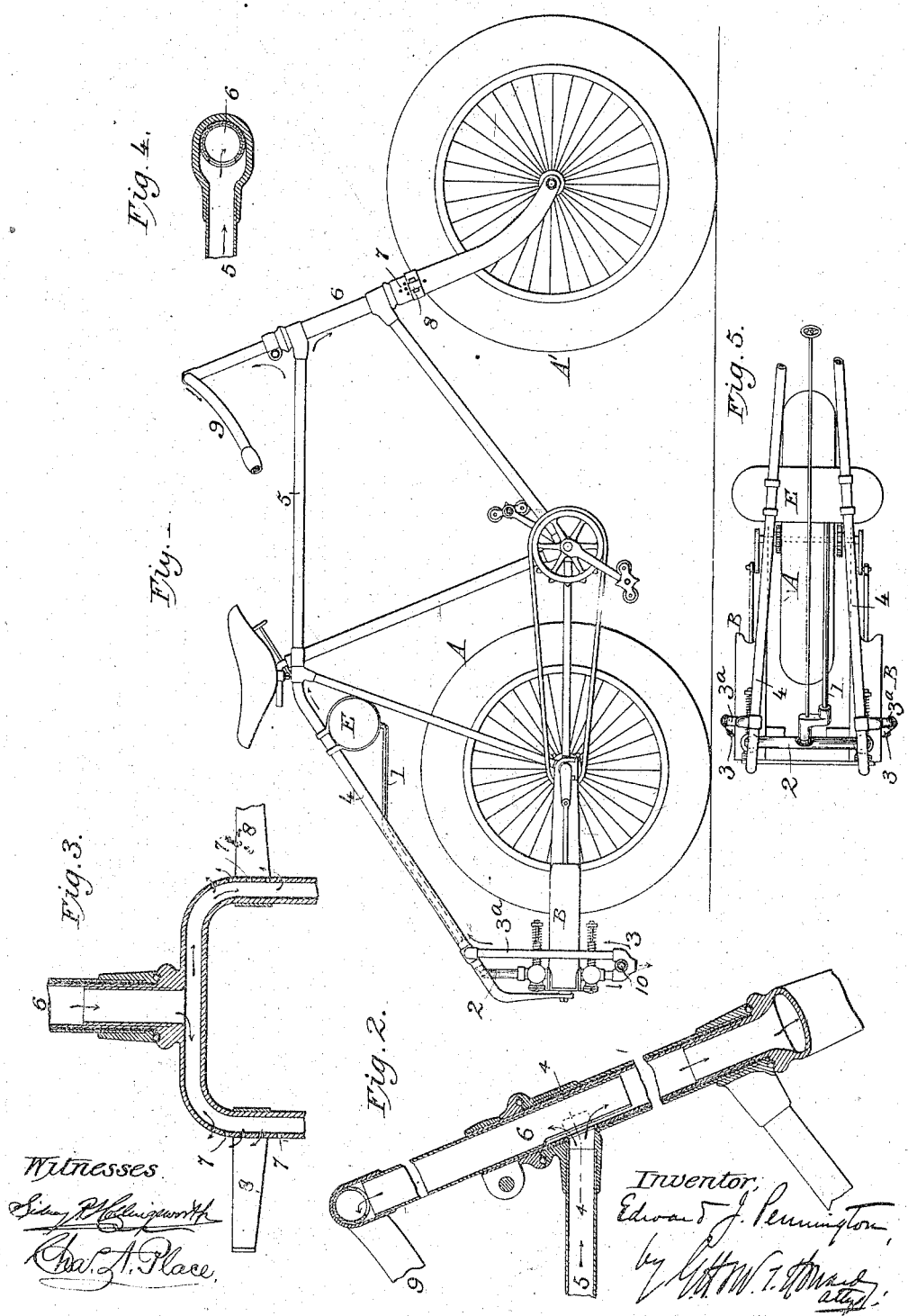

UNITED STATES PATENT OFFICE.

EDWARD J. PENNINGTON, OF CLEVELAND, OHIO.

MOTOR VEHICLE.

SPECIFICATION forming part of Letters Patent No. 570,441, dated October 27, 1896.

Application filed February 6, 1895. Serial No. 537,676. (No model.) Patented in England December 11, 1895, No. 23,771.

*To all whom it may concern:*

Be it known that I, EDWARD J. PENNINGTON, of Cleveland, in the county of Cuyahoga and State of Ohio, have invented certain new and useful Improvements in Wheeled Vehicles, of which the following is a specification, reference being had to the accompanying drawings and to the letters and numerals of reference marked thereon.

This invention is patented in England in Patent No. 23,771, dated December 11, 1895.

My invention is more especially adapted to light vehicles of the bicycle, tricycle, quadricycle, or polycycle class having a motor driven by a mixture of gasolene or the like and air admitted behind the piston of the motor, and which mixture, after compression, is exploded so as to produce the necessary power.

The special object of my invention is to convey the heat developed in the combustion of the explosive mixture to certain parts of the machine, as those upon or near which the feet of the rider rest, or which are engaged by his hands in the steering of the vehicle.

In the accompanying drawings, Figure 1 is a side elevation of a motor-driven bicycle embodying my invention. Fig. 2 is a longitudinal vertical section showing a portion of the fork and its post or standard and connections. Fig. 3 is a transverse vertical section of a portion of the fork and its connected parts. Fig. 4 is a horizontal section on the line 4 4 of Fig. 2. Fig. 5 is a plan of the rear part of the machine.

Similar letters and numerals of reference indicate similar parts in the respective figures.

A A' represent the wheels of a vehicle of the bicycle class. The wheels may be of the kind ordinarily used in the improved class of bicycles, tricycles, and similar vehicles, but are here shown as having pneumatic tires of enlarged area, the function of which is more particularly set forth in my application, Serial No. 524,833, filed October 3, 1894.

The frame of the machine is substantially that found in approved vehicles of this class, being made principally of tubing to give the requisite strength and lightness. The arrangement of the frame is suitably modified to allow the application of the motor to the vehicle.

The motor B is preferably of the type described in said application, Serial No. 524,833, and also in my application, Serial No. 531,020, filed December 6, 1894. In that motor the products of combustion of the mixture of air and gasolene, or the like, after the explosion thereof, which effects the useful work, are exhausted into the open air. The tank or vessel for holding the driving fluid is shown by E, and the fluid is conveyed to the rear of the piston through the medium of the pipe 1, leading to the arched connection 2, while the air for mixture therewith is admitted through spring-controlled valves, also united to said arched connection.

A charge having been compressed and exploded, the products of combustion enter the U-shaped branch of connection 3 and pass up the pipe 3ª to the tubular portions 4 and 5 of the frame, reaching the hollow post 6 of the fork, a portion of the products escaping through the apertures 7, which are in the immediate vicinity of the foot-rests 8, while the remaining portion passes upward into the hollow handle-bar, escaping from the tubular handle 9. The heat developed in the exhaust is thus transmitted to such parts of the machine as are in contact with or in proximity to the feet and hands of the rider, and sufficient warmth is distributed to keep these extremities comfortably warm in cold weather. When the heat is not required for this purpose, the exhaust may be made into the open atmosphere by adjusting the cock 10 in the U-shaped connection 3.

Figs. 2 and 4 show the removal of a segment of the hollow post 6, so that in the partial revolution of the post in the action of steering there will always be free passage for the entrance of the products of combustion to its interior. Fig. 4 shows the enlargement of the socket portion of the frame part receiving the post 6, so as to allow for the freer entrance of the products of combustion.

My invention is capable of modification in details of construction, and I have only shown one of the various forms in which it may be applied to the purpose in view.

Having described my invention, I claim—

1. In a wheeled vehicle of the character described, a motor operated by the explosion of a mixture of fluid and air, and a tubular framework constituting exhaust-pipes for said motor, combined with a hollow fork-post and a hollow handle-bar, each in communication with said exhaust-pipes, and having, respectively, apertures near the foot-rests and handles for the escape of products of combustion, substantially as and for the purpose set forth.

2. In a wheeled vehicle of the character described, a motor operated by the explosion of a mixture of combustible fluid and air, tubular framework constituting exhaust-pipes for said moter, a hollow fork-post, and a hollow handle-bar, said post and bar having communication with said exhaust-pipes, and provided, respectively, with apertures near the foot-rests and handles for the escape of products of combustion, combined with a cock whereby said products may be directed to said exhaust-pipes or allowed to escape to the open atmosphere, substantially as and for the purposes set forth.

In testimony whereof I hereto set my hand and seal.

EDWARD J. PENNINGTON. [L. S.]

Witnesses:
 DORR C. SMITH,
 WM. H. KELLER.